United States Patent
Bharadwaj (10) Patent No.: US 9,699,262 B2
(45) Date of Patent: Jul. 4, 2017

(54) INTEGRATED VIEWING OF LOCAL AND REMOTE APPLICATIONS IN VARIOUS MULTIPLATFORM ENVIRONMENTS

(71) Applicant: Srinivas Bharadwaj, Los Altos, CA (US)

(72) Inventor: Srinivas Bharadwaj, Los Altos, CA (US)

(*) Notice: Subject to any disclaimer, the term of this patent is extended or adjusted under 35 U.S.C. 154(b) by 607 days.

(21) Appl. No.: 14/066,511

(22) Filed: Oct. 29, 2013

(65) Prior Publication Data
US 2015/0120807 A1    Apr. 30, 2015

(51) Int. Cl.
*H04L 29/08*    (2006.01)
*H04W 4/00*    (2009.01)

(52) U.S. Cl.
CPC ......... *H04L 67/2809* (2013.01); *H04W 4/003* (2013.01)

(58) Field of Classification Search
CPC ............................ H04L 67/2809; H04W 4/003
USPC .......................................................... 709/203
See application file for complete search history.

(56) References Cited

U.S. PATENT DOCUMENTS

| | | | | |
|---|---|---|---|---|
| 5,727,950 A * | 3/1998 | Cook | ................. | G09B 5/02 434/350 |
| 8,924,970 B2 * | 12/2014 | Newell | ............... | G06F 9/45545 718/1 |
| 9,171,139 B2 * | 10/2015 | Newell | ................. | G06F 21/31 |
| 9,317,175 B1 * | 4/2016 | Lockhart | ............ | G06F 3/04815 |
| 9,448,825 B2 * | 9/2016 | Newell | ............... | G06F 9/45545 |
| 9,465,633 B2 * | 10/2016 | Newell | ............... | G06F 9/45533 |
| 2002/0032751 A1 * | 3/2002 | Bharadwaj | ............. | H04L 29/06 709/218 |
| 2011/0271226 A1 * | 11/2011 | Janssen | .................. | H04L 29/06 715/794 |
| 2012/0129503 A1 * | 5/2012 | Lindeman | ............. | H04W 4/001 455/414.1 |
| 2012/0240183 A1 * | 9/2012 | Sinha | ................... | H04W 12/08 726/1 |
| 2013/0007848 A1 * | 1/2013 | Chaskar | ................ | H04W 12/12 726/4 |
| 2013/0117742 A1 * | 5/2013 | Newell | ............... | G06F 9/45545 718/1 |
| 2015/0341418 A1 * | 11/2015 | Zhou | .................... | H04L 67/025 715/740 |

* cited by examiner

*Primary Examiner* — Arvin Eskandarnia
*Assistant Examiner* — Javier O Guzman (57) ABSTRACT

The embodiments provide a system and method for providing integrated view of applications installed in multi-platform environment. The method includes creating a connection between server(s) in a cloud and a client device using a connection broker. Further, the method includes providing a list of remote applications installed in at least one Operating System (OS) of the server on the client device, where each remote application generates a remote graphical view. Furthermore, the method includes allowing a user of the client device to select a remote application, and launching the selected remote application on the server. Furthermore, the method includes displaying, on the client device, an integrated view where including the remote graphical view of the launched application and local graphical views of local applications installed in OS of the client device.

27 Claims, 8 Drawing Sheets

INTEGRATED VIEWING OF LOCAL AND REMOTE APPLICATIONS IN VARIOUS MULTIPLATFORM ENVIRONMENTS

TECHNICAL FIELD

The embodiments herein generally relate to computing environments and, more particularly, to a mechanism for providing multi-platform views of local and remote applications associated with different operating systems.

BACKGROUND

A plethora of devices from phones and tablets, to wearable technologies like watches have substantially increased productivity of workforce. As these devices start gaining an application base, the need to integrate them into existing networks and operating systems is becoming important. Several modes of application execution will evolve to manage different applications (Aka. apps) in the existing networks and operating systems. In order to integrate these platforms into existing networks and operating systems, several problems related to security, connectivity, session state, reconnection, and the like have to be resolved. Virtualization has rapidly grown in importance. The ability to support multiple environment and operating systems on the same host is becoming a mainstream platform feature. As the apps need to match the executable operating system as well as mode of use of user (mobile, hands-free, voice-based, gesture based, and the like), cloud based execution becomes increasingly necessary to facilitate application execution and maintenance, As client-side virtualization require more memory and computing power, it may not be frequently used. A further requirement is to maintainability and upgradeability so that applications can be reused over a period of time without becoming outdated. Furthermore, existing networks, operating systems, and platform may have difficulty in fitting into Buy Your Own Device (BYOD) environments. The difficulty with handling dynamic BYOD environments can be partly due to security related problems and partly due to the fact that these electronic devices (like tablets) represents a new computing platform in enterprise networks. The total cost of ownership of many devices easily exceeds the cost of hardware platform itself. With BYOD, hardware cost could be borne by a user but, the maintenance costs are often borne by the enterprise. To this end, there is a need of a system and method where a new device is allowed to enter and leave into the existing networks, operating systems, and platforms "at will".

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a system and method for providing integrated view of applications installed in multi-platform environment. The method includes creating a connection between server(s) and a client device using a connection broker. Further, the method includes providing a list of remote applications installed in at least one Operating System (OS) of the server on the client device, where each remote application generates a remote graphical view. Furthermore, the method includes allowing a user of the client device to select a remote application, and launching the selected remote application on the server. Furthermore, the method includes displaying, on the client device, an integrated view including the remote graphical view of the launched application and local graphical views of local applications installed in OS of the client device. Unlike conventional system, multiple applications that are hosted on multiple remote servers can be part of the same "integrated view". The integrated view, for instance, can include several Android applications, iPad applications, windows applications, and the like along with the local applications hosted on the client device. The client device transparently runs these applications as part of the same view. Though the remote application is launched in the server but, the integrated view displays the remote application on the client device in a way as if the application is in the hosted in the client device itself.

The proposed system and method is simple, reliable, and robust for providing multi-platform views of local and remote applications associated with different operating systems. The system and method offers extensible, upgradeable, reusable server based multi-platform views to integrate with the existing techniques, network, and OS's over a period of time without becoming outdated. For instance, the fact that popular platforms have fully fledged browsers but, often particular applications that run on the browsers might not really work on a particular device as the browser might not have the full required support. The solution is to turn to remote displays or potentially reengineer the browser or a judicious combination of both where the browser on the server is accessed through the remote display. The combination of multi-platform environments can facilitate the ability for these devices to be versatile in existing environments and morph as needed for prescient and serendipitous requirements. The system and method can be used to enable the front end of the devices to become versatile so that it can be seamlessly integrated into any computing environment (for example, be it in the enterprise, carrier network, at home, in public places, and the like). The users can maintain separate environments for work and for personal use, thus separating their virtual connections and logging in differently in each network. For instance, the personal environment might allow for handoffs and switching to a different network, while the work environment will only allow for access to servers and services inside the corporate network with varying levels of security. Furthermore, the proposed system and method can be implemented on the existing infrastructure and may not require extensive set-up or instrumentation.

Referring now to the drawings, and more particularly to FIGS. 1 through 8, where similar reference characters denote corresponding features consistently throughout the figures, there are shown embodiments.

Figure 1:
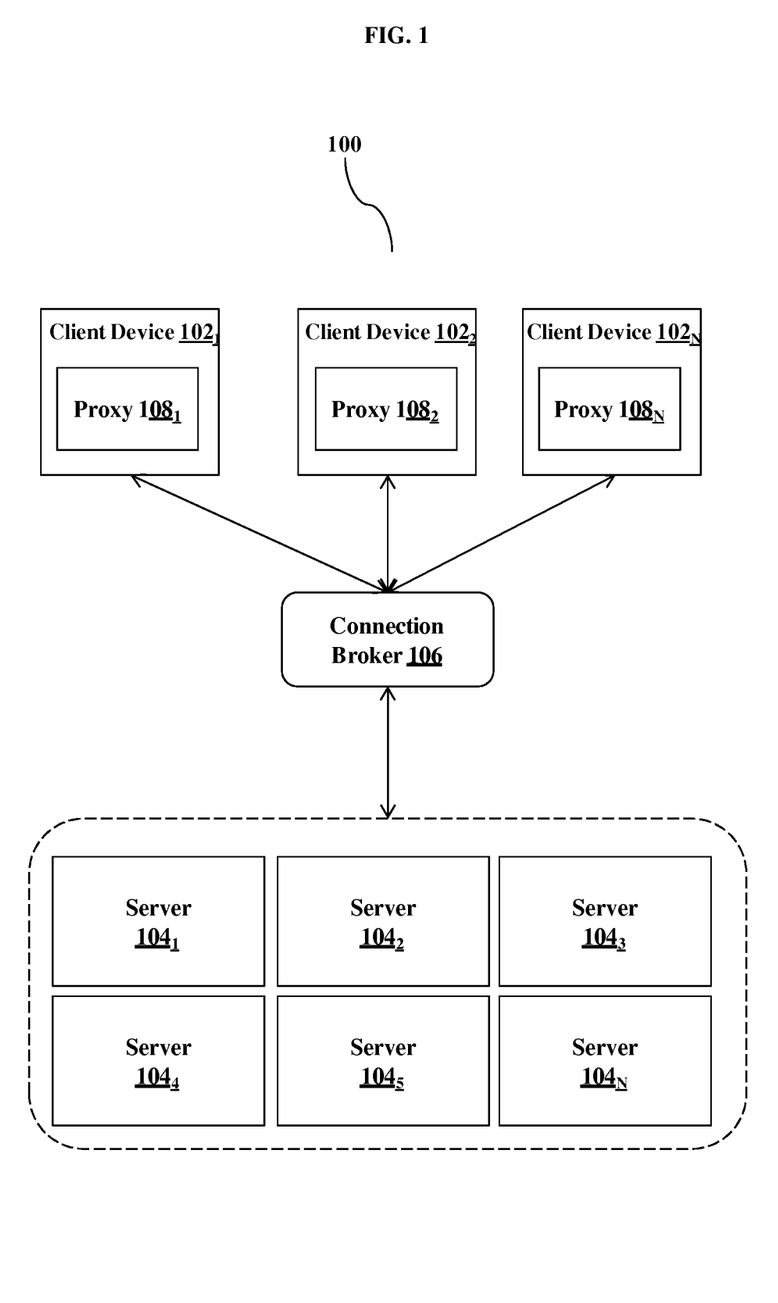
FIG. 1 illustrates generally, among other things, a high level overview of a system, according to embodiments disclosed herein.

FIG. 1 illustrates generally, among other things, a high level overview of a system 100, according to embodiments disclosed herein. In an embodiment, the system 100 includes one or more client devices $102_{1-N}$ (hereafter referred as client device 102) communicating with one or more servers $104_{1-N}$ (hereafter referred as server(s) 104) using a connection broker 106. The client device 102 described herein can be for example, but not limited to, a mobile device, a Smartphone, a tablet, a computing device, a television, a wearable computing device, a glass, a cell phone, a display, a monitor, a desktop, a headless or headed machines, a single headed device, a double headed device and in general any computing device that is portable and configured for wireless connectivity with a network. In some embodiment, the client device 102 may operate as a virtual machine running within a virtualization platform that is itself running on top of the operating system (OS) of the client device 102. In addition, such client device 102 may effectively employ the system and method as described herein when utilizing a variety of operating systems, such as the "Windows-CE", "Windows ME", "Palm OS", "Linux", Android, iOS, or other operating systems such as real-time operating systems. The client device 102 can be configured to include a proxy 108 to establish a connection with the server 104 using the connection broker 106. The connection broker 106 described herein can be configured to manage the connections between the client device 102 and the server 104. In various embodiments, the connection broker 106 may run on a separate server or in separate virtual machines running on the same server or different servers. Prior to connecting with the server 104, user of the client device 102 may submit user credentials to the connection broker 106 in a secure manner and the connection broker 106 forwards them onto the server 104 hosting a session so that the user can be logged into the remote session without entering the credentials again.

In an embodiment, the server 104 described herein can be, for example, but not limited to, any general purpose computer, desktop, portable device, headless or headed machines, single headed device, double headed device, traditional servers, desktops, media devices like DVD players and set-top boxes, gaming platforms, enterprise servers running Unix, Windows, Mac OS and other popular platforms. The server 104 can communicating with the client device 102 using the connection broker 106. The word "server" can be used in two different ways in this document. "Server" as applied to a client-server hardware system implies a server computer that services a client device's needs. On the other hand, the word "server" as applied to a user-interface ("windowing") environment denotes a program that runs on a computer with which a user interacts. In a client-server computing system using an X-window type user interface environment, the "X-server" is a program that runs on client device and is configured to capture events that are generated at the client device and transmit them to an "application" running on the server computer. In this document, the word "server" should be understood based on the context in either of these two ways. In some embodiment, the server 104 may operate as a virtual machine running within a virtualization platform that is itself running on top of the operating system (OS) of the server 104. In addition, such server 104 may effectively employ the system and method as described herein when utilizing a variety of operating systems, such as the "Windows-CE", "Windows ME", "Palm OS", "Linux", Android, iOS, or other operating systems such as real-time operating systems.

The FIG. 1 shows a limited overview of the system 100 but, it is to be understood that another embodiment is not limited thereto. Further, the system 100 can include different modules communicating among each other along with other hardware or software components. For example, the component can be, but not limited to, a process running in the electronic device, an executable process, a thread of execution, an application, or a computer. By way of illustration, both an application running on a host device and the host device can be the component.

Figure 2:
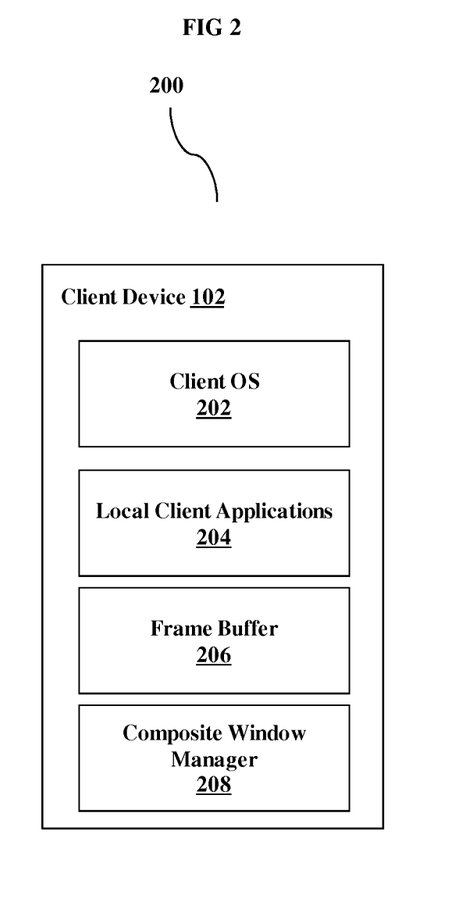
FIG. 2 illustrates various modules of client device, according to embodiments as disclosed herein.

FIG. 2 illustrates various modules 200 of the client device 102, according to embodiments as disclosed herein. In an embodiment, the client device 102 includes a client OS 202, and local client applications 204 running on top of the client OS 202. Further, the client device 102 can include a frame buffer 206 that stores display data and drives the user interface. In an instance, the client OS 202 can be an Android operating system provided by Google, Inc., and including a composite window manager 208 (known in the android operating system as a SurfaceFlinger) that manages and controls access by client applications 204 to the frame buffer 206 for display of user interfaces (UIs). The composite window manager 208 can be configured to generate an integrated view of the client application and remote applications present on the server 104. Multiple applications that are hosted on multiple remote servers 104 can be integrated into the same integrated view long with the local applications hosted on the client device 102. For example, the integrated view can include Android applications, iPad applications, windows applications, and the like along with the local applications. Further, a mobile application runtime environment that executes the client applications 204 developed for the client OS 202. The mobile application runtime environment may be optimized for mobile computing resources such as lower processing power or limited memory space. The mobile application runtime environment may rely on kernel for process isolation, memory management, and threading support. Functions and instructions for the client OS 202 may be stored as computer program code on a tangible computer readable medium of the client device 102.

Figure 3:
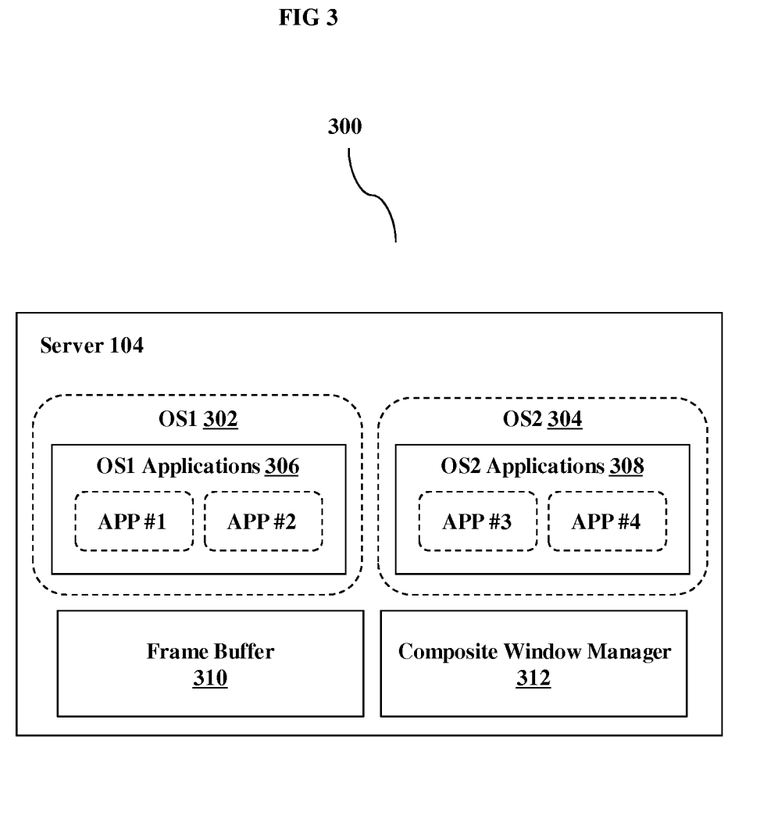
FIG. 3 illustrates various modules of server, according to embodiments as disclosed herein.

FIG. 3 illustrates various modules 300 of the server 104, according to embodiments as disclosed herein. In an embodiment, the FIG. 3 shows the server 104 employed to run two OS's concurrently, namely OS1 302 and OS2 304 respectively. The OS1 302 and the OS2 304 can be independent operating systems, specifically, may have independent and incompatible user libraries, graphics systems, or framework layers. In an example, the OS1 302 can be a mobile OS, a desktop OS, and the like. Similarly, the OS2 304 can be a mobile OS, a desktop OS, and the like. The OS1 302 and the OS2 304 can run concurrently on a shared kernel. The OS1 302 can include OS1 applications 306 running on top of the OS1 302. The applications APP#1 and APP#2 run in application layer supported by application framework layer of the OS1 302. Similarly, in the OS2 304 can include OS2 applications 308 running on top of the OS2 304. The applications APP#3 and APP#4 run in application layer supported by application framework layer of the OS2 304.

Further, the server 104 can include a frame buffer 310 that stores display data and drives the user interface and a composite window manager 312 (known in the Android operating system as SurfaceFlinger) that manages and controls access by applications to the frame buffer 310 for display of UIs. Further, a mobile application runtime environment that executes the applications developed for the OS1 302 and the OS2 304. The mobile application runtime environment may be optimized for mobile computing resources such as lower processing power or limited memory space. The mobile application runtime environment may rely on kernel for process isolation, memory management, and threading support. Functions and instructions for the OS1 302 and the OS2 304 may be stored as computer program code on a tangible computer readable medium of the server 104. Thought the FIG. 3 shows that the server 104 is employed with two OS's but, it is to be understood that other embodiments are not limited thereto. Furthermore, the server 104 can be employed with only one, or two, or any number of different types of OS's.

Figure 4:
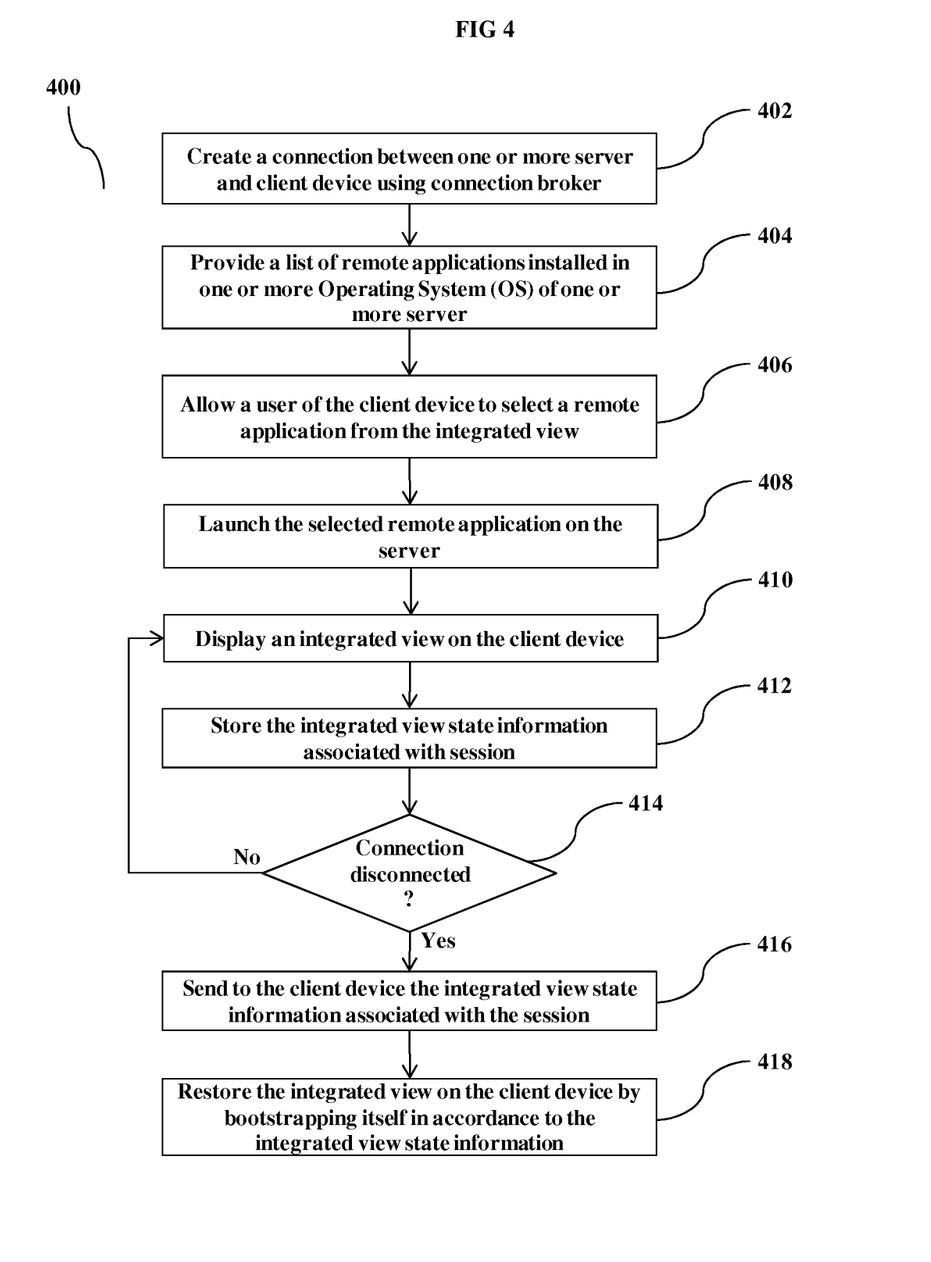
FIG. 4 illustrates a flow diagram illustrating a method for providing an integrated view of applications installed in multi-platform environment, according to embodiments as disclosed herein.

FIG. 4 illustrates a flow diagram illustrating a method 400 for providing an integrated view of applications installed in multi-platform environment, according to embodiments as disclosed herein. The method 400 and other description described herein can provide a basis for a control program which can be easily implemented using a microprocessor, microcontroller, or an equivalent thereof. In an embodiment, at step 402, the method 400 includes creating a connection between the client device 102 and one or more server 104 using the connection broker 106. The proxy 108, which runs in the client device 102, may submit the user credentials to create the connection with the connection broker 106. The connection broker 106 may forward them onto the server 104 hosting a session so that the user can be logged into the remote session without entering the credentials again.

At step 404, the method 400 includes providing a list of remote applications installed in the OS's of the server 104 in a cloud, where each local application generates a remote graphical view. Each server 104 can include different applications associated with the multiple OS's. The connection broker 106 can be configured to discover and generate the list of applications installed in the OS's of each server 104 in the cloud and display the list on the client device 102. At step 406, the method 400 includes allowing a user of the client device 102 to select one more remote application from the list of remote applications. The user can select one or more remote application from the client device 102, such as to launch or interact with the application. At step 408, the method 400 includes launching the selected remote application on the server 104. The method 400 allows the proxy 108 to request to launch the selected remote application on the server 104. An appropriate server 104 from the cloud for launching the application is identified and the selected remote application is launched on the identified server 104.

Further, at step 410, the method 400 includes displaying an integrated view on the client device 102. The integrated view described herein can include the remote graphical view associated with the remotely launched application along with the graphical views of local application installed in the OS of the client device 102. Unlike conventional system, multiple applications that are launched on multiple remote servers can be part of the same "integrated view". For example, the integrated view can include several Android applications, iPad applications, windows applications, and the like along with the local applications hosted on the client device. The composite window manager 208 can be configured to manage and control access by the applications to the frame buffer 206 for display of the integrated view on the user interfaces. The client device 102 can be configured to include applications installed locally on the client device 102, where each local application generates a local graphical view. The composite window manager 208, in communication with the frame buffer 206, can be configured to integrate the local and remote applications graphical views and generate the integrated view to be displayed on the client device 102. Multiple mechanisms can be used to include different remote application associated with different OS's into the client device 102 to provide the integrated view. Such mechanisms can include for example, but not limited to, Android surface flinger, redirect graphics call to Graphics Device Interface (GDI) remotely to the server 104, build a Remote Desktop Protocol (RDP) proxy which acts as an RDP client that calls remote surface flinger, a similar proxy can built for Virtual Network Computing (VNC), Microsoft RemoteFX, remote frame buffers, and the like. Further, details related to some of the mechanisms are described in conjunction with the FIGS. 5 to 7. Furthermore, though the remote application is launched in the server 104 but, the integrated view displays the remote application on the client device 102 in a way as if the application is in the client device itself.

Furthermore, at step 412, the method 400 includes storing the integrated view state information associated with the session. The integrated view state information can be stored on the server 104 such that the integrated view can be automatically restored on the client device 102. In order for the client device 102 to provide the integrated view of the number of remote that may run on a number of different application servers along with the local application of the client device 102, it is necessary to maintain the integrated view state information including state of each of these applications at some location, preferably on the respective servers 104. Advantageously, the integrated view state information can be stored so that in case of a disconnection between the client device and the server, a user may reestablish his state easily.

At step 414, the method 400 includes determining whether the connection is disconnected or terminated with the client device 102. The connection may be disconnected or terminated due to any error or when the user turn-off the client device 102. In an embodiment, the client device 102 can be in one of several states with respect to sessions: an active state of the session, which is when an application is actively running; and a standalone state when there is no active session at a given instant. State of the client device 102 can be defined within the context of the session with the server 104. The session can be said to be active if an application is active and controls the display at a particular instant. When the client device 102 transitions from the active state, it could either go to a suspended state, a disconnected state or a terminated state for that session. For example, the suspended state is when the client device 102 transitions from one to another application view. This second application could be running on either the same server or on another server. When in the suspended state, the client device 102 can choose to disconnect either by sending a message or by breaking the connection (if there is one). The server 104 may not know if the client device 102 has transitioned to the disconnected state or not unless it has explicitly said so. Thus, the servers 104 can wait for prespecified periods of time before assuming that they are disconnected. The server 104 can be configured to cache all information needed to restore the integrated view associated with the session.

At step 416, the method 400 includes sending the integrated view state information in response to determining that the connection is disconnected or terminated. The client device 102 may not have any ability to command reconstruction of the state. The sessions are forced to rely on the servers 104 to help the client device 102. The server 104 may receive a reconnection request from the client device 102. Upon receiving the reconnection request (implying a move from either suspended, terminated, or disconnected state) back to the prior state, the method 400 allows the server 104 to send the integrated view state information on the client device 102.

At step 418, the method 400 includes restoring the integrated view on the client device by bootstrapping itself in accordance to the integrated view state information. The display of the integrated view on the client device 102 can be restored after reconnection. The client device 102 can be automatically bootstrap back to their prior existing state notably to reestablish connections to the user's running applications. At the time of bootstrap the client device 102 obtains session, security, and state information about the user's current list of applications and verifies the user credentials to authenticate the user. Following authentication, the client device 102 is bootstrapped back to its prior existing state. Application list protocol (along with Dynamic host control protocol (DHCP)) can be intended to provide support for this process and can be implemented by the application list manager. For example, it can communicate with an application list manager UI, which is hosted by the bootstrap server that drives the UI of the client device with an application from where the user can launch additional applications and browse their current integrated view.

Furthermore, the process of maintaining the states and restoring/reestablishing the connection by bootstrapping the devices are adapted herein from application Ser. No. 09/863,425 filed on May 22, 2001 titled "REMOTE DISPLAYS IN MOBILE COMMUNICATION NETWORKS".

Furthermore, the various applications can be automatically updated using auto update applications hosted in the servers. The servers can be configured to manage the applications running on the client device. There may be no user interaction and the servers can be managed by an administrator, who can setup upgrades, start times, and schedule applications. The upgradability feature can be easily implemented using the techniques known in the art. For example, Google Cloud Messaging (GCM) is a messaging framework that can be used to build the upgradability feature. The GCM is a free service that helps developers to send data from servers to their Android applications on Android devices. This can be a lightweight message informing the android applications that there is new data to be fetched from the server.

Furthermore, multimodal applications may have a significant impact on the future of computing environment. The multimodal applications require that the platform and the application interoperate to provide an integrated look and feel involving both audio and visual input/output mechanism. The multimodal applications accept input from key and touch panels as well as from speech. The spoken word could lead to a meta-action (like help on the overall screen), might be context sensitive to the current location of the cursor or might lead to the launch of a new application (and have been intended for the application manager). The semantic import of the speech could thus vary with the User Interface. The use of deictic gestures with coordinated speech input may offer new and powerful user interfaces that could easily form the basis for building compelling and attractive user interfaces. Further, multimodality brings added robustness as errors in speech recognition could be rectified through visual re-verification.

The various actions, units, steps, blocks, and acts described in the methods 400 may be performed in the order presented, in a different order, or simultaneously. Further, in some embodiments, some actions, units, steps, blocks, and acts listed in the FIG. 4 may be omitted, added, skipped, and modified without departing from the scope of the embodiment.

Figure 5:
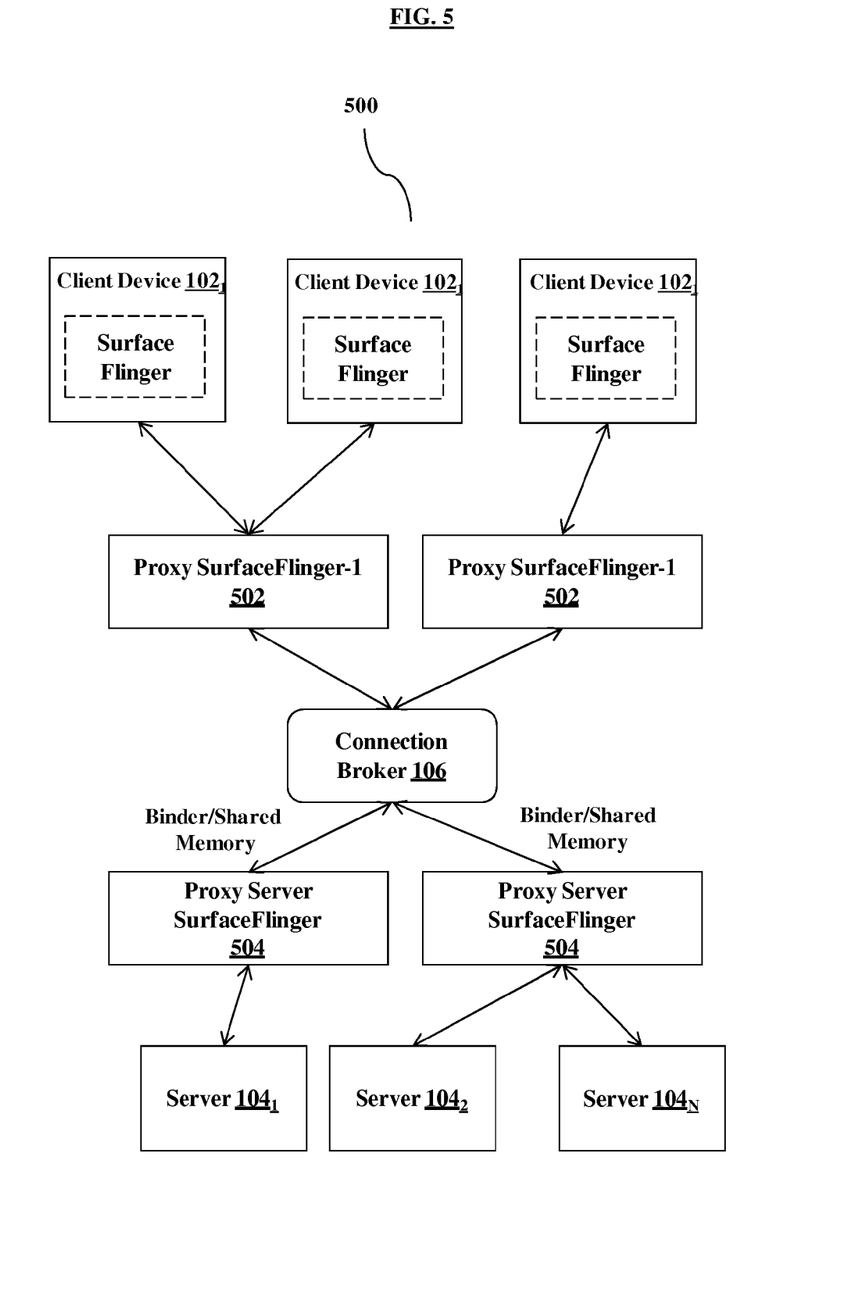
FIG. 5 illustrate an example remote SurfaceFlinger architecture for providing the integrated views of applications installed in multi-platform environment, according to embodiments as disclosed herein.

FIG. 5 illustrates an example remote SurfaceFlinger architecture 500 for providing the integrated views of the applications installed in multi-platform environment, according to embodiments as disclosed herein. Generally, the Android OS graphics system uses a client-server model, in which the composite window manager (known in the Android OS as SurfaceFlinger) can be graphics server and applications are the clients. The SurfaceFlinger is the User Interfaces (UI) X-Manager which relies on OpenGL to talk to the frame buffer. The SurfaceFlinger typically maintains a list of display ID's and keeps track of assigning applications to display ID's. Graphics information for the applications or activities includes windows, views, canvasses, and the like. Each window, view, or canvas can be implemented with an underlying surface object. Surface objects are double-buffered (front and back buffers) and synchronized across processes for drawing. The SurfaceFlinger maintains all surfaces in a shared memory pool which allows all processes to access and draw into them without expensive copy operations and without using a server-side drawing protocol such as X-Windows. Applications always draw into the back buffer while the SurfaceFlinger reads from the front buffer. The SurfaceFlinger creates each surface object, maintains all surface objects, and also maintains a list of surface objects for each application. When the application finishes drawing in the back buffer, it posts an event to the SurfaceFlinger, which swaps the back buffer to the front and queues the task of rendering the surface information to the frame buffer. The SurfaceFlinger monitors all window change events. When one or more window change events occur, the SurfaceFlinger renders the surface information to the frame buffer for one or more displays.

Further, in an embodiment, the SurfaceFlinger can itself manages the displays and can be the OpenGL based application. The OpenGL library manages the frame buffer. This separation allows the front side of a UI-based Application to run anywhere, while the SurfaceFlinger process could be running on the client device 102 with a display in the case where the UI is local on the client device 102. To facilitate distributed applications it is necessary to build a distributed form of binder. As illustrated in the FIG. 5, the remote SurfaceFlinger architecture 500 is built through the use of a proxy SurfaceFlinger $502_{1-N}$ (simply referred as proxy SurfaceFlinger 502) that can run in the application layer of the client device 102. In an embodiment, the adaptations here can be specific to Android and its specific SurfaceFlinger based graphics architecture. The proxy SurfaceFlinger 502 can be configured to create a connection with the server 104 using the connection broker 102. The SurfaceFlinger can be configured to provide the integrated view inciting the multiple applications that are installed on multiple servers 104. Note that the multiple applications hosted in multiple servers in multiple OS environment is part of the same "integrated view" along with the local applications installed in the OS of the client device 102. The client device 102 transparently runs the various applications as part of the same integrated view in a way as if the applications are in the client device itself. The integrated view can be managed by the SurfaceFlinger on the server 104 while the various applications interact with it. For Windows and Mac OS, the corresponding front ends can interact with the SurfaceFlinger on the server 104 through proxy server SurfaceFlinger 504.

Figure 6:
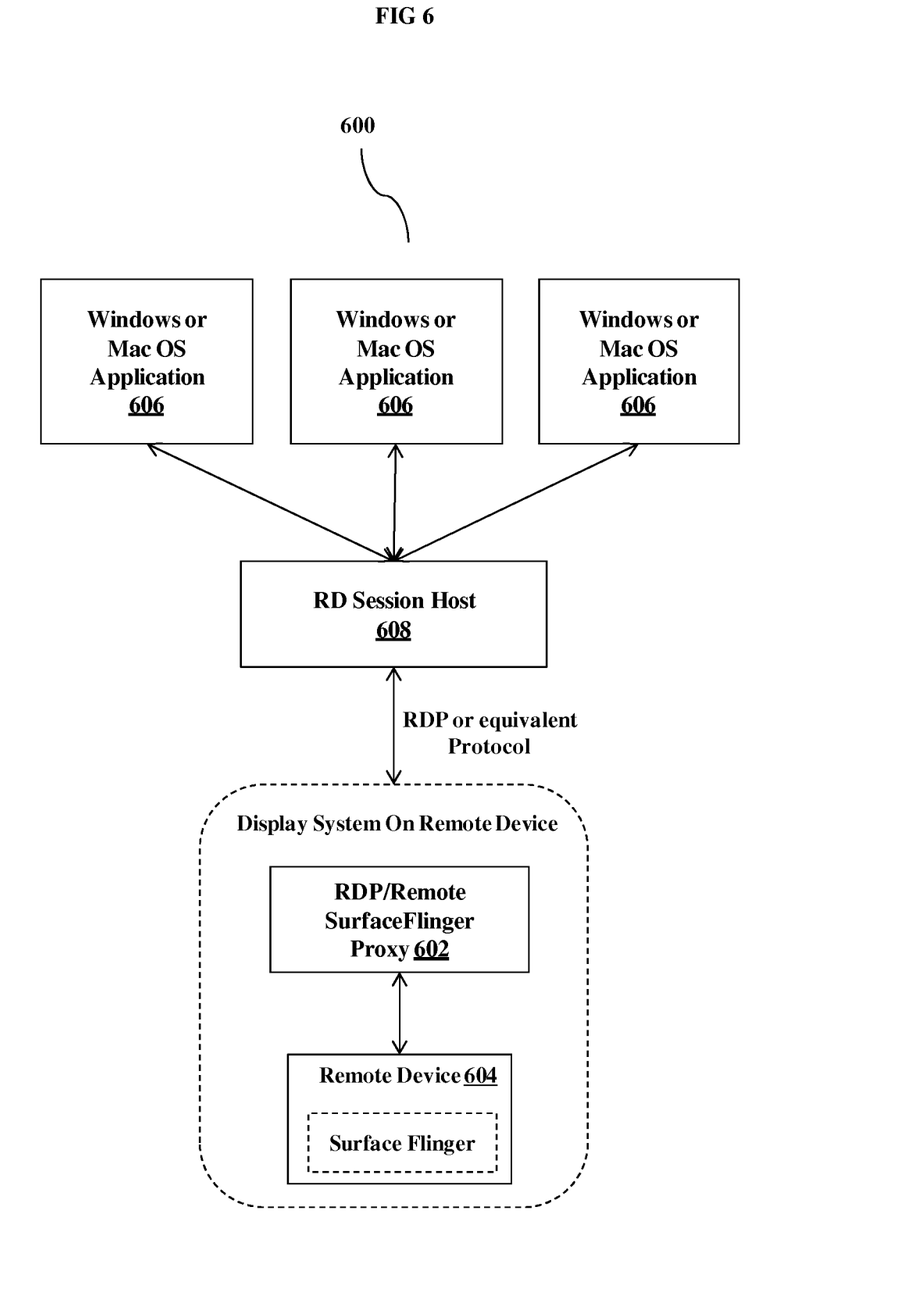
FIG. 6 illustrate an example RDP remote SurfaceFlinger architecture for providing the integrated views of applications installed in multi-platform environment, according to embodiments as disclosed herein.

FIG. 6 illustrate an example RDP remote SurfaceFlinger architecture 600 for providing the integrated views of applications installed in multi-platform environment, according to embodiments as disclosed herein. In an embodiment, a RDP/Remote SurfaceFlinger proxy 602 can be the client for the SurfaceFlinger on a remote device 604, which talks to the frame buffer that drives the display of the integrated view. In an example, Windows or Mac OS applications 606 are provide in the network. The RDP/Remote SurfaceFlinger proxy 602 can create a session with the a RD session host 608 using a RDP or an equivalent protocol such as to remote launch the Windows or Mac OS application 606 on the remote device 604. The RDP/Remote SurfaceFlinger proxy 602 can communicate with the frame buffer which stores the display data and drives the integrated view on the user interface of the remote device 604. The integrated view described herein can include both the local application of the remote device 604 and the windows and Mac applications.

Figure 7:
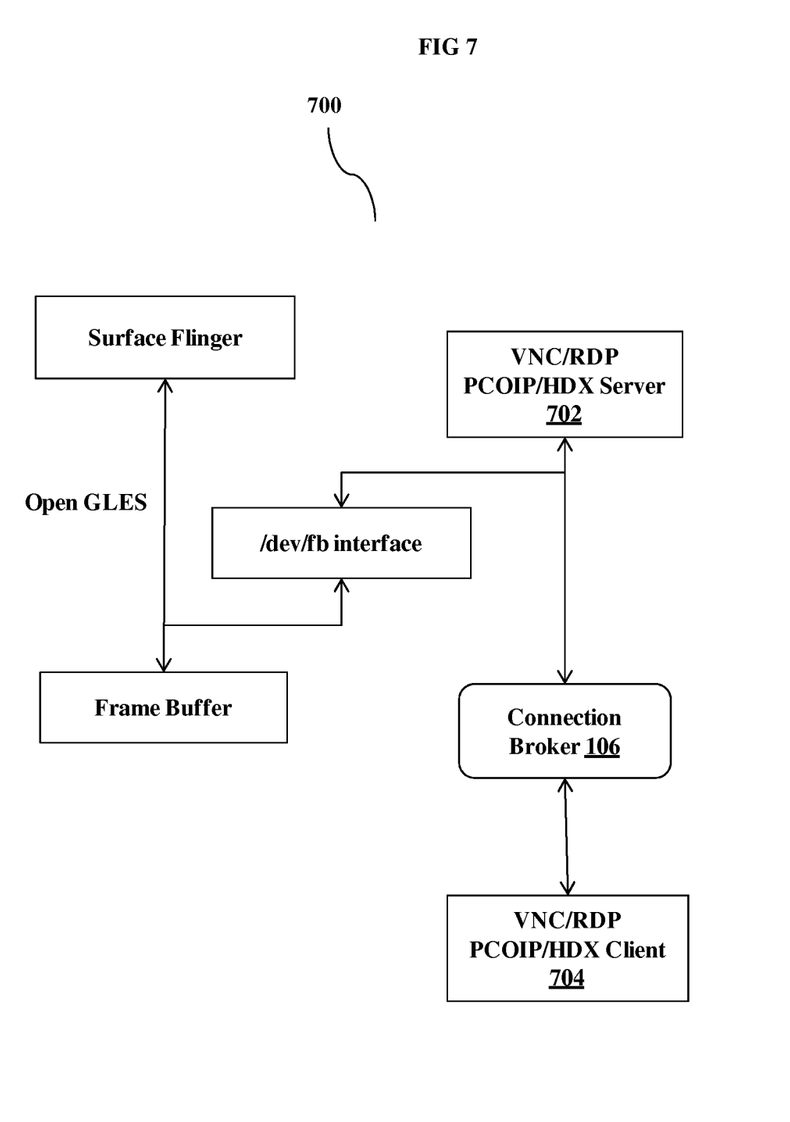
FIG. 7 illustrate an example remote frame buffer based architecture for providing the integrated views of applications installed in multi-platform environment, according to embodiments as disclosed herein.

FIG. 7 illustrate an example remote frame buffer based architecture 700 for providing the integrated views of applications installed in multi-platform environment, according to embodiments as disclosed herein. In an embodiment, the remote frame buffer based architecture 700 uses an enhanced RCP, Virtual Network Computing (VNC), PC-over-IP (PCOIP), HDX and the like based protocols. The connection broker 106 can be used to create a connection between a VNC/RDP PCOIP/HDX server 702, and a VNC/RDP PCOIP/HDX client 704. The applications can read the underlying the frame buffer on the VNC/RDP PCOIP/HDX client 704 performs a differentiation algorithm on dirtied pixels and sends them over to the VNC/RDP PCOIP/HDX server 702.

Further, when there are multiple applications running on one client exported to one remote display, the remote frame buffer models suffice. When multiple applications from different clients are to be exported to one view, the remote SurfaceFlinger based architecture might prove more convenient and appropriate. Further, the various mechanisms enables front end of the devices to become versatile that can be seamlessly integrated into any computing environment. This seamless integration can enables ability for the devices to be versatile in multi-platform environments. Such a system and method can be used enhance productivity with multiple views and environments. The enhanced productivity can be achieved by allowing the users to maintain multiple views and environments. This lets the users operate in multiple projects, have environments that are cross functional both from a professional and from a personal point of view.

Furthermore, in an embodiment, the client device 102 can include multiple touch screen displays or can be a double headed device that has two screens (i.e., the application is displayed on both displays at the same time). The SurfaceFlinger typically maintains a list of display ID's and keeps track of assigning applications to display ID's. For example, the display ID1 can be associated with one of the touch screen display or one screen and display ID2 can be associated with the other touch screen display or the screen. Graphics information for the applications or activities includes windows, views, canvasses, and the like. Each window, view, or canvas can be implemented with an underlying surface object which are double-buffered (front and back buffers) and synchronized across processes for drawing. The SurfaceFlinger creates each surface object, maintains all surface objects, and also maintains a list of surface objects for both the touch surfaces or screens of the application. When one or more window change events occur, the SurfaceFlinger renders the surface information to the frame buffer for both the touch surface's or screen's of the client device 102.

The various labels, modules, components, devices, names, elements, operations, or the like described with respective to FIGS. 1 to 7 are only for illustrative purpose and does not limit the scope of the embodiment. Further, it is understood that any other labels, modules, components, devices, names, elements, operations, can be used to perform the same, similar, or substantially similar operations or functions without departing from the scope of the embodiment.

Figure 8:
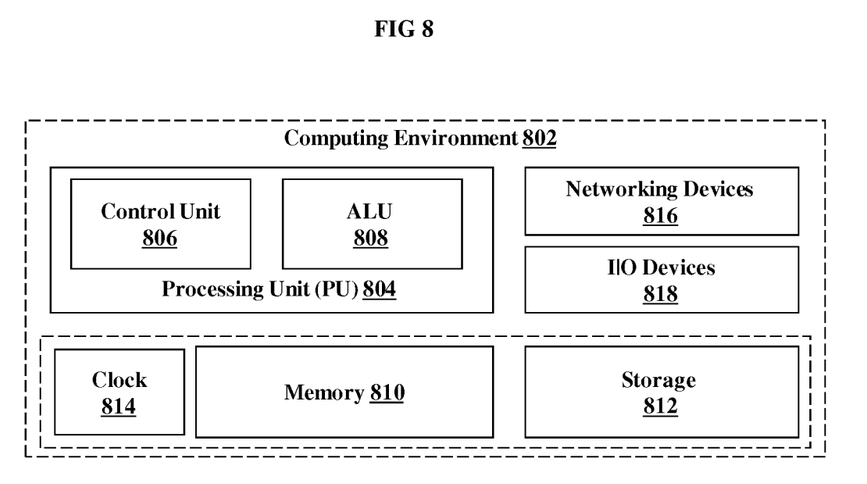
FIG. 8 is a computing environment implementing the system and method, according to embodiments as disclosed herein.

FIG. 8 illustrates a computing environment 802 implementing the system and methods, according to the embodiments as disclosed herein. As depicted the computing environment 802 comprises at least one processing unit 804 that is equipped with a control unit 806 and an Arithmetic Logic Unit (ALU) 808, a memory 810, a storage unit 812, plurality of networking devices 814 and a plurality Input output (I/O) devices 816. The processing unit 804 is responsible for processing the instructions of the algorithm. The processing unit 804 receives commands from the control unit 806 in order to perform its processing. Further, any logical and arithmetic operations involved in the execution of the instructions are computed with the help of the ALU 808.

The overall computing environment 802 can be composed of multiple homogeneous and/or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 810 or the storage 812 or both. At the time of execution, the instructions may be fetched from the corresponding memory 810 or storage 812, and executed by the processing unit 804. In case of any hardware implementations various networking devices 814 or external I/O devices 816 may be connected to the computing environment to support the implementation through the networking unit and the I/O device unit.

The embodiments disclosed herein can be implemented through at least one software application running on at least one hardware device and performing network management functions to control the elements. The elements shown in FIGS. 1 through 8 include blocks, steps, operations, and acts, which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for providing integrated view of applications installed in a multi-platform environment by a client device using a processor and a composite window manager, the method comprising:
    creating, by said client device, a connection with at least one server in a cloud using a connection broker;
    providing, by said client device, a list of remote applications installed in an Operating System (OS) of said at least one server on said client device, wherein the remote application is at least one of executable application and browser-based application, wherein each said remote application generate at least one remote graphical view, wherein said list of remote applications is not supported by a mobile OS running in said client device, wherein said OS of said at least one server is different than said mobile OS running in said client device;
    detecting, by said client device, at least one remote application from said list of remote applications selected by a user of the client device;
    launching, by said client device, said at least one selected remote application on said at least one server; and
    generating and displaying, by said client device, an integrated view comprising said at least one remote graphical view of said at least one launched application and at least one local graphical view of at least one local application installed in said mobile OS of said client device, wherein said client device transparently runs said selected remote application as a part of said integrated view in said mobile OS of said client device, wherein said composite manager integrates said at least one remote graphical view of said at least one launched remote application and said at least one local graphical view of said at least one local application in said integrated view based on multi-protocol support, wherein said composite manager controls an access level of said launched remote application in said integrated view.

2. The method of claim 1, wherein said client device comprises a proxy application configured to create said connection with said at least one server, wherein said proxy application is a proxy surface flinger, wherein said remote OS is an Android OS and said composite window manager is a Surface flinger.

3. The method of claim 1, wherein said remote application is at least one of a running application, a downloadable application, and an executable application, wherein said list of remote applications are provided based on one of a work environment and a personal environment.

4. The method of claim 1, wherein said local application is at least one of a running application, a downloadable application, and an executable application.

5. The method of claim 1, wherein launching said at least one selected remote application on said at least one server further comprises:
    requesting, by a proxy application, to launch said at least one selected remote application on said at least one server using said connection broker;
    identifying said at least one server to launch said at least one selected remote application; and
    launching said at least one selected remote application on said at least one identified server.

6. The method of claim 1, wherein generating and displaying said integrated view on said client device further comprises:
    receiving said at least one graphical view of said at least one remotely launched application on said at least one server;
    identifying said at least one local application installed in said mobile OS of said client device, wherein each said local application generate said at least one local graphical view;
    generating said integrated view by integrating said at least one remote graphical view and said at least one local graphical view, wherein said at least one remote application view is integrated by morphing said at least one remote application view with said at least one local graphical view; and
    displaying said integrated view on said client device.

7. The method of claim 1, wherein creating said connection between said at least one server in said cloud and said client device using said connection broker further comprising:
    requesting said user to submit user credentials related to said connection broker prior to enabling said client device to display said list of remote applications; and
    establishing a session with said client device in response to successful authentication said user credential.

8. The method of claim 1, wherein said method further comprises:
    storing said integrated view state information associated with said session established with said client device;
    if said client device is disconnected, accepting a reconnection request from said client device;
    sending to said client device said integrated view state information associated with said session; and
    restoring said integrated view on said client device by bootstrapping itself in accordance to said integrated view state information, wherein display of said integrated view on said client device is restored after reconnection.

9. The method of claim 1, wherein said method further comprises automatically upgrading said at least one remote application in said integrated view, wherein said at least one remote application is managed and integrated using said composite manager in said client device so that said remote application is run in said mobile OS of said client device without becoming outdated.

10. A system for providing integrated view of applications installed in a multi-platform environment, the system comprising at least one server comprising a processor and a composite window manager configured to:
  create a connection between said at least one server in a cloud and a client device using a connection broker,
  provide a list of remote applications installed in Operating System (OS) of said at least one server on said client device, wherein the remote application is at least one of executable application and browser-based application, wherein each said remote application generate at least one remote graphical view, wherein said list of remote applications is not supported by an mobile OS running in said client device, wherein said OS of said at least one server is different than said mobile OS running in said client device,
  detect at least one remote application from said list of applications selected by a user of said client device,
  launch said at least one selected remote application on said at least one server, and
  generate and display an integrated view on said client device, wherein said integrated view comprises said at least one remote graphical view of said at least one launched remote application and at least one local graphical view of at least one local application installed in said mobile OS of said client device, wherein said client device transparently runs said selected remote application as a part of said integrated view in said mobile OS of said client device, wherein said composite manager integrates said at least one remote graphical view of said at least one launched remote application and said at least one local graphical view of said at least one local application in said integrated view based on multi-protocol support, wherein said composite manager controls access level of said launched remote application in said integrated view.

11. The system of claim 10, wherein said client device comprises a proxy application configured to create said connection with said at least one server, wherein said proxy application is a proxy surface flinger, wherein said remote OS is an Android OS and said composite window manager is a Surface flinger.

12. The system of claim 10, wherein said remote application is at least one of a running application, a downloadable application, and an executable application, wherein said list of remote applications are provided based on one of a work environment and a personal environment.

13. The system of claim 10, wherein said local application is at least one of a running application, a downloadable application, and an executable application.

14. The system of claim 10, wherein launch said at least one selected remote application on said at least one server further comprises:
  request, by a proxy application, to launch said at least one selected remote application on said at least one server using said connection broker,
  identify said at least one server to launch said at least one selected remote application, and
  launch said at least one selected remote application on said at least one identified server.

15. The system of claim 10, wherein generate and display said integrated view on said client device further comprises:
  receive said at least one graphical view of said at least one remotely launched remote application on said at least one server,
  identify said at least one local application installed in said mobile OS of said client device, wherein each said local application generate said at least one local graphical view,
  generate said integrated view by integrating said at least one remote graphical view and said at least one local graphical view, wherein said at least one remote application view is integrated by morphing said at least one remote application view with said at least one local graphical view, and
  display said integrated view on said client device.

16. The system of claim 10, wherein create said connection between said at least one server in said cloud and said client device using said connection broker further comprising:
  request said user to submit user credentials related to said connection broker prior to enabling said client device to display said list of remote applications, and
  establish a session with said client device in response to successful authentication said user credential.

17. The system of claim 10, wherein said at least one server is further configured to:
  store said integrated view state information associated with said session established with said client device,
  if said client device is disconnected, accepting a reconnection request from said client device,
  send to said client device said integrated view state information associated with said session, and
  restore said integrated view on said client device by bootstrapping itself in accordance to said integrated view state information, wherein display of said integrated view on said client device is restored after reconnection.

18. The system of claim 10, wherein said at least one server is further configured to automatically upgrade said at least one remote application in said integrated view, wherein said at least one remote application is managed using said composite manager in said client device so that said remote application is run in said mobile OS of said client device without becoming outdated.

19. A computer program product for providing integrated view of applications installed in a multi-platform environment, the product comprising:
  an integrated circuit comprising at least one processor;
  at least one memory having a computer program code within said circuit, wherein said at least one memory and said computer program code with said at least one processor cause said product to:
  create a connection between at least one server in a cloud and a client device using a connection broker,
  provide a list of remote applications installed in an Operating System (OS) of said at least one server on said client device, wherein the remote application is at least one of executable application and browser-based application, wherein each said remote application generate at least one remote graphical view, wherein said list of remote applications is not supported by an mobile OS running in said client device, wherein said OS of said at least one server is different than said mobile OS running in said client device,
  detect at least one remote application from said list of remote applications selected by a user of said client device,
  launch said at least one selected remote application on said at least one server, and
  generate and display an integrated view on said client device, wherein said integrated view comprises said at least one remote graphical view of said at least one launched remote application and at least one local graphical view of at least one local application installed in mobile OS of said client device, wherein said client device transparently runs said selected remote application as a part of said integrated view in said mobile OS of said client device, wherein said composite manager integrates said at least one remote graphical view of said at least one launched remote application and said at least one local graphical view of said at least one local application in said integrated view based on multi-protocol support, wherein said composite manager controls access level of said launched remote application in said integrated view.

20. The computer program product of claim 19, wherein said client device comprises a proxy application configured to create said connection with said at least one server, wherein said proxy application is a proxy surface flinger, wherein said remote OS is an Android OS and said composite window manager is a Surface flinger.

21. The computer program product of claim 19, wherein said remote application is at least one of a running application, a downloadable application, and an executable application, said list of remote applications are provided based on one of a work environment and a personal environment.

22. The computer program product of claim 19, wherein said local application is at least one of a running application, a downloadable application, and an executable application.

23. The computer program product of claim 19, wherein launch said at least one selected remote application on said at least one server further comprises:
  request, by a proxy application, to launch said at least one selected remote application on said at least one server using said connection broker,
  identify said at least one server to launch said at least one selected remote application, and
  launch said at least one selected remote application on said at least one identified server.

24. The computer program product of claim 19, wherein generate and display said integrated view on said client device further comprises:
  receive said at least one graphical view of said at least one remotely launched application on said at least one server,
  identify said at least one local application installed in said mobile OS of said client device, wherein each said local application generate said at least one local graphical view,
  generate said integrated view by integrating said at least one remote graphical view and said at least one local graphical view, wherein said at least one remote application view is integrated by morphing said at least one remote application view with said at least one local graphical view, and
  display said integrated view on said client device.

25. The computer program product of claim 19, wherein create said connection between said at least one server in said cloud and said client device using said connection broker further comprising:
  request said user to submit user credentials related to said connection broker prior to enabling said client device to display said list of remote applications, and
  establish a session with said client device in response to successful authentication said user credential.

26. The computer program product of claim 19, wherein said at least one memory and said computer program code with said at least one processor further cause said product to:
  store said integrated view state information associated with said session established with said client device,
  if said client device is disconnected, accepting a reconnection request from said client device,
  send to said client device said integrated view state information associated with said session, and
  restore said integrated view on said client device by bootstrapping itself in accordance to said integrated view state information, wherein display of said integrated view on said client device is restored after reconnection.

27. The computer program product of claim 19, wherein said at least one memory and said computer program code with said at least one processor further cause said product to automatically upgrade said at least one remote application in said integrated view, wherein said at least one remote application is managed using said composite manager in said client device so that said remote application is run in said mobile OS of said client device without becoming outdated.

\* \* \* \* \*